March 14, 1950     W. J. BRETH     2,500,273
TREAD SPLICE STITCHER
Filed Feb. 5, 1947     3 Sheets-Sheet 1
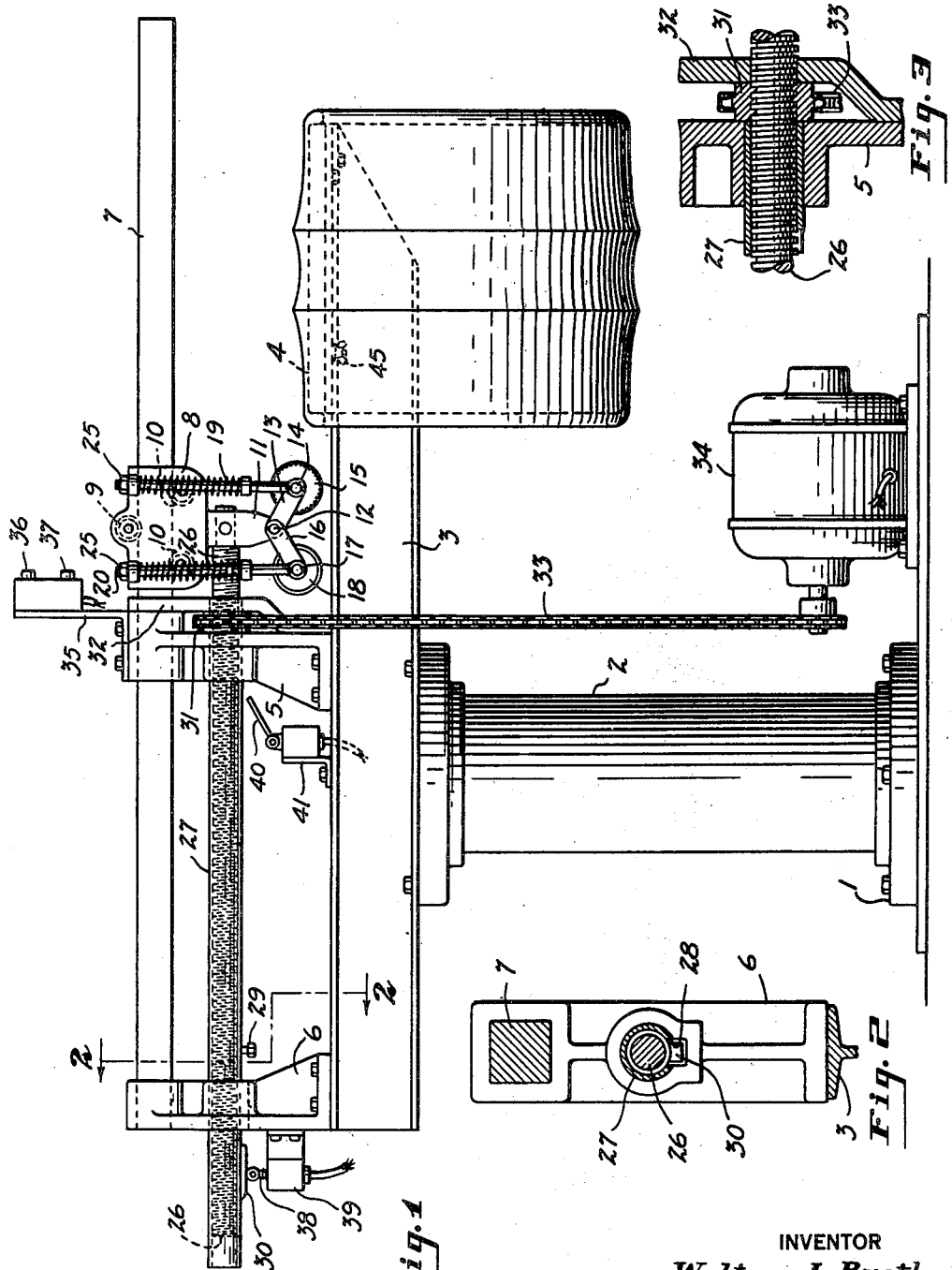
INVENTOR
*Walter J. Breth*
BY *Evans + McCoy*
ATTORNEYS March 14, 1950 W. J. BRETH 2,500,273
TREAD SPLICE STITCHER
Filed Feb. 5, 1947 3 Sheets-Sheet 2
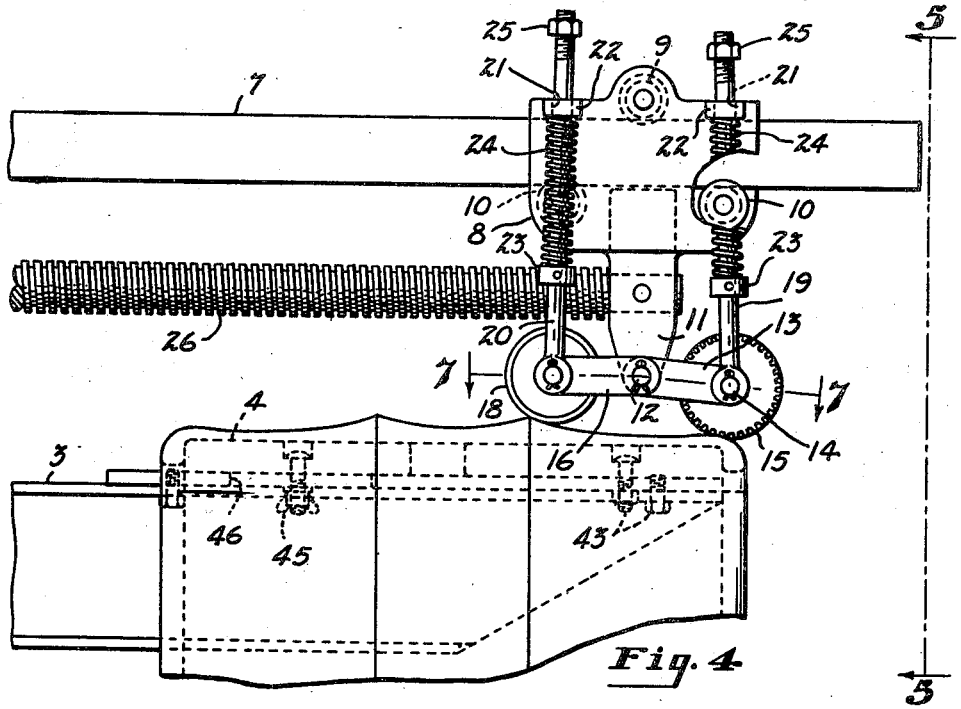
Fig. 4
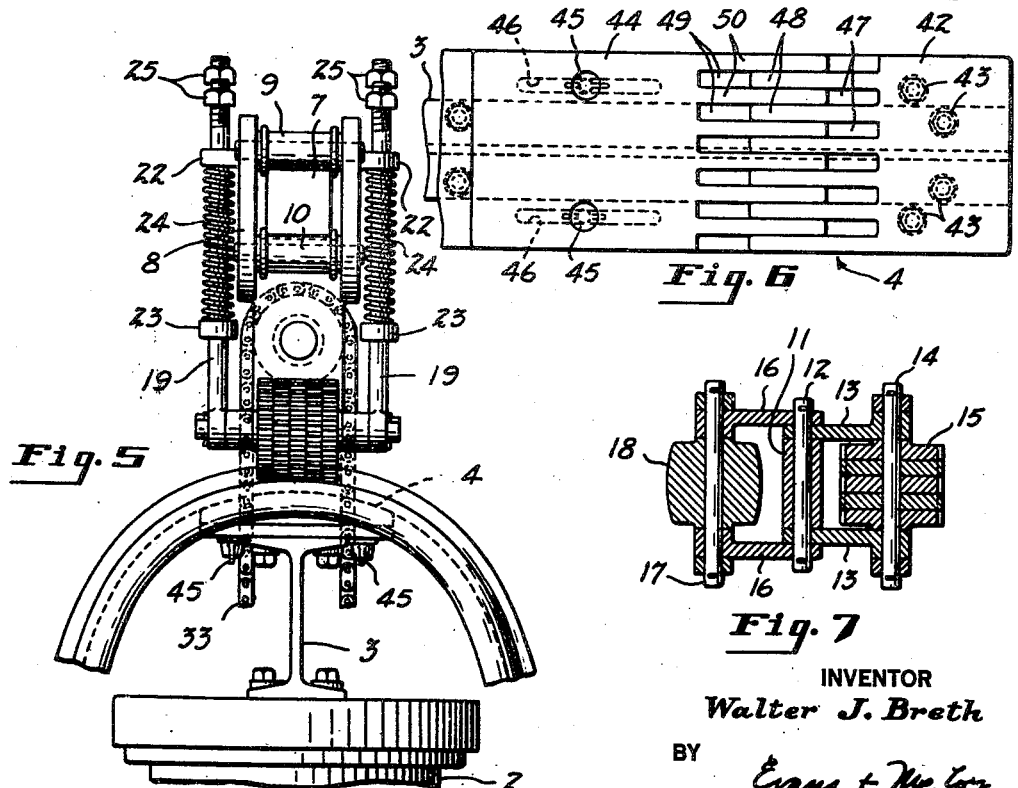
Fig. 5
Fig. 6
Fig. 7
INVENTOR
Walter J. Breth
BY
Evans & McCoy
ATTORNEYS

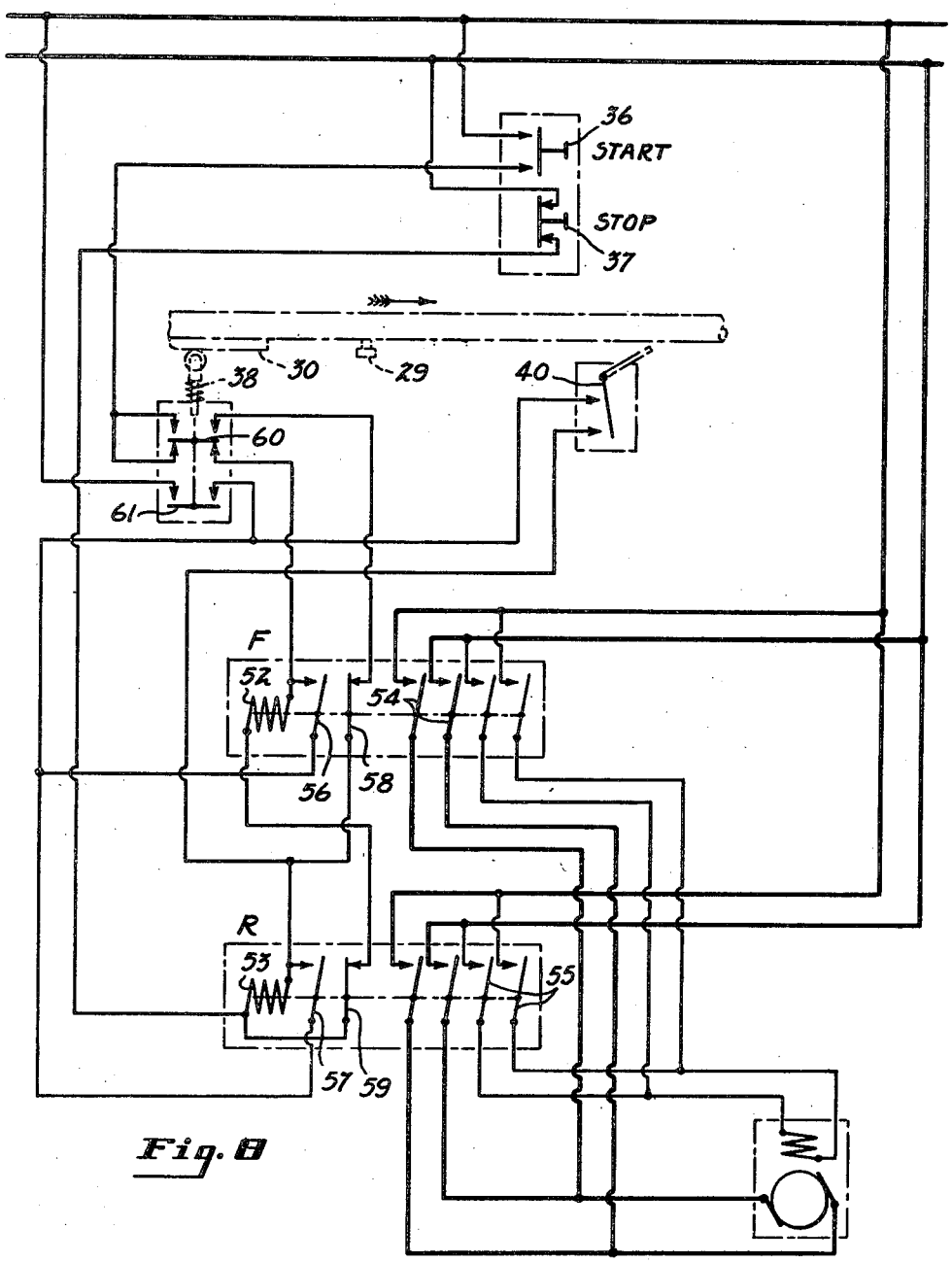

Patented Mar. 14, 1950

2,500,273

UNITED STATES PATENT OFFICE 2,500,273

TREAD SPLICE STITCHER

Walter J. Breth, Akron, Ohio, assignor to The General Tire and Rubber Company, Akron, Ohio, a corporation of Ohio Application February 5, 1947, Serial No. 726,612

7 Claims. (Cl. 154—10)

This invention relates to a machine for stitching the tread splice on a drum built tire casing.

In building tires composed largely of synthetic rubber, it has been found to be difficult to obtain a uniform and strong union of the tread rubber of a tire casing at the splice.

The present invention has for its object to provide a stitching machine to which the tire casing may be transferred from the tire building drum, and to provide the said machine with means for subjecting the tread splice to the action of stitching rollers moving in tandem along the splice and transversely across the tire casing.

The invention has for a further object to provide a machine equipped with stitching rollers that are adapted to firmly unite the rubber at the splice in one reciprocating movement across the tire tread.

A further object of the invention is to provide an improved anvil or backing member that is adjustable to fit tires of various sizes.

With the above and other objects in view, the invention may be said to comprise the machine as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which:

Figure 1 is a side elevation of the machine;

Fig. 2 is a transverse section on an enlarged scale taken on the line indicated at 2—2 in Fig. 1;

Fig. 3 is a fragmentary sectional view showing the carriage actuating mechanism;

Fig. 4 is a fragmentary side elevation showing the stitching rollers at the forward end of their stroke;

Fig. 5 is a front elevation of the machine;

Fig. 6 is a plan view of the adjustable tire supporting and positioning member which serves as an anvil during the stitching operation;

Fig. 7 is a section through the stitching rollers taken on the line indicated at 7—7 in Fig. 4; and Fig. 8 is a wiring diagram showing the motor control circuits.

The machine of the present invention has a frame comprising a base 1, a pedestal 2 and a horizontal beam 3 mounted on top of the pedestal and projecting from the pedestal to provide a supporting arm upon which the tire casing may be supported. The tire receiving end of the beam 3 carries an anvil 4 that fits within the periphery of a tire casing and between the beads thereof so as to hold the casing against movement during the stitching operation.

The beam 3 carries spaced brackets 5 and 6 which support a guide rail 7 above the beam 3 and parallel thereto. The rail 7 is preferably of rectangular cross section and supports a carriage 8 that is provided with a top roller 9 that engages the top of the rail 7 and spaced rollers 10 that engage the bottom face of the rail 7. The carriage 8 has a downwardly projecting center portion 11 which supports a horizontal shaft 12 at its lower end. A pair of forwardly projecting links or arms 13 are pivoted at their rear ends to the shaft 12 and support a horizontal shaft 14 at their forward ends. The shaft 14 supports a toothed stitching roller 15 which as shown in Fig. 7 is composed of a series of identical gears mounted side by side on the shaft. The gears which form the roller 15 are in face to face engagement, but may turn one with respect to another. A pair of rearwardly extending arms or links 16 are pivoted to the shaft 12 and support a horizontal shaft 17 upon which is mounted a rear stitching roller 18 which is a one piece roller provided with a smooth periphery of transversely convex form.

The shafts 14 and 17 have rods 19 and 20 pivoted thereto and these rods extend vertically through openings 21 formed in flanges 22 on the carriage 8. Each of the rods has a collar 23 attached thereto below the flange 22 and a spring 24 is mounted on each of the rods 18 and 19 between its collar 23 and the flange 22. The springs 24 serve to resist upward movement of the stitching rollers. The rods 19 and 20 have threaded upper ends and each carries a nut 25 that is engageable with the top of a flange 22 to limit the downward movement of the stitching rollers. By adjustment of the nuts 25 the height at which the stitching rollers 15 and 18 are normally supported above the beam 3 may be regulated.

An elongated screw 26 is attached at its forward end to the carriage 8 and extends rearwardly from the carriage beneath the rail 7 and parallel thereto. The screw 26 is slidably mounted in a tube 27 that is supported in the brackets 5 and 6 and the tube 27 is provided with a longitudinal slot 28 in the under side thereof which receives a downwardly projecting stud 29 attached to the screw and also a flat bar 30 attached to the screw. The stud 29 and bar 30 serve to restrain rotation of the screw and also serve as control members for the screw actuating mechanism.

Immediately in front of the forward bracket 5 a combined sprocket and nut 31 is mounted on the screw 26, the nut 31 being confined between the front face of the bracket 5 and a retaining plate 32 attached to the bracket 5. The nut 31 is driven by means of a sprocket chain 33 that is driven by an electric motor 34 mounted on the base 1. When the nut 31 is rotated in one direction by means of the motor 34 the screw 26 is moved forwardly to carry the stitching rollers across a tire casing supported on the forward end of the beam 3, and when the motor is rotated in the opposite direction the screw and carriage are retracted.

A suitable control panel is mounted at a convenient place on the frame such as on a bracket 35 attached to the top of the bracket 5 and this panel is provided with a push button starting switch 36 and a push button switch 37 which serves as an emergency stop switch. A limit switch 38 mounted on a bracket 39 attached to the rear bracket 6 is actuated by the plate 30 carried by the screw to stop the motor and a reversing switch 40 carried by a bracket 41 attached to the beam 3 is adapted to be actuated by the stud 29 to reverse the motor at the forward end of the stroke of the carriage.

The anvil 4 has a front section 42 that is attached to the forward end of the beam 3 by means of bolts 43 and a rear section 44 telescopically connected to the front section and adjustably connected to the beam 3 by means of bolts 45 extending through longitudinal slots 46 in the flanges of the beam 3. The rear end of the forward section 42 is provided with longitudinal slots 47 which provide fingers 48 that fit in slots 49 formed in the rear section 44, the slots 49 forming fingers 50 which fit in the slots 47. The top surface of the anvil conforms to the cylindrical interior of the tire casing and the interfingering telescopic connection between the sections provides a substantially continuous pressure receiving surface. By adjusting the section 44, the anvil may be lengthened or shortened to fit between the beads of tire casings of various sizes.

When a tire casing is mounted upon the anvil 4 as shown in Figs. 1 and 4, the carriage 8 is moved from the position shown in Fig. 1 to the position shown in Fig. 4, causing the rollers 15 and 18 to engage with the exterior of the tire tread and move in tandem forward and back across the tire casing. The tire casing is placed with the tread splice in alinement with the stitching rollers so that the splice is pressed throughout its width by the toothed roller and along its center by the crowned roller while these rollers move forward and back along the length of the splice. The roller 15, which serves to apply a stitching pressure substantially across the full width of the splice, is of toothed form so that it is capable of applying considerable pressure to the rubber stock without forming a traction wave such as would be formed in front of a smooth cylindrical roller. The crowned roller following the toothed roller applies a substantial pressure along the center of the splice and effectively complements the action of the toothed roller effecting a stronger union of the rubber, particularly in the thick portion of the tread. By providing a toothed roller and a crowned roller in tandem, the tread splice may be adequately stitched by one reciprocating movement of the rollers across the tire casing.

As shown in Fig. 8, the motor is controlled by the switches 36, 38 and 40 to impart one complete reciprocating movement to the carriage 8. The motor is controlled by forward and reverse relays 52 and 53 which operate groups of normally open switches 54 and 55, the switches 54 serving to connect the windings of the motor to a source of the current in such manner as to drive the motor in a direction to move the carriage in a forward direction and the switches 55 serving to connect the windings of the motor to the source of current in such manner as to drive the motor in a reverse direction. The relays 52 and 53 have normally open switches 56 and 57 and normally closed switches 58 and 59. The switches 56 and 57 are holding switches. The switch 58 provides a connection from the starting switch to the reversing relay 53 under certain conditions, and the switch 59 serves to deenergize the relay 52 when the relay 53 is energized.

The switch 38 carries a contact member 60 which serves to connect the starting switch 36 to either of the relays 52 or 53 and a contact member 61 that serves to break the circuit and stop the motor upon actuation of the switch 38. When the carriage is in its rearmost position the plate 30 engages the switch 38 and holds the contact member 60 in a position to place the starting switch 36 in series with the forward relay 52. With the switch 38 in this position, actuation of the switch 36 energizes the relay 52, causing the motor to be driven in a direction to move the carriage forwardly. As soon as the plate 30 moves out of contact with the switch 38 the contact member 61 moves to closed position so that actuation of the switch 40 by the stud 29 will energize the reverse relay 53. Upon energization of the relay 53, the switch 59 is opened, deenergizing the relay 52. The motor is then operated in the reverse direction until the plate 30 again engages the switch 38, moving the contact 61 to open position and deenergizing the motor. After the plate 30 has been moved out of engagement with the switch 38 the contact 60 moves to a position connecting the starting switch 36 in series with the reversing relay 53 so that if the emergency stop switch 37 is actuated to stop the motor, the motor will be operated in a reverse direction to move the carriage back to starting position if the starting switch 36 is subsequently operated. If for any reason it should be desired to move the carriage forwardly from the position in which it is stopped, this can be done by holding the switch 38 down while operating the starting switch.

It is to be understood that variations and modifications of the specific devices herein shown and described for purposes of illustration, may be made without departing from the spirit of the invention.

What I claim is:

1. A tire tread stitching machine comprising a horizontal supporting arm having an anvil portion on the top thereof that conforms to the cylindrical interior of a drum built tire casing and that fits between the beads of the casing, said anvil comprising telescopically connected sections one fixed to said arm and the other adjustable longitudinally of said arm to vary the length of the anvil to fit tire casings of different sizes, a carriage above said arm mounted to reciprocate longitudinally of the arm, and a stitching roller on said carriage.

2. A tire tread stitching machine comprising a horizontal supporting arm having an anvil portion on the top thereof that conforms to the cylindrical interior of a drum built tire casing and that fits between the beads of the casing, said anvil comprising two sections formed with slotted and interfingered ends, means for rigidly securing one section to the arm, means for adjustably securing the other section to the arm, and a carriage provided with stitching rollers mounted to reciprocate longitudinally of the anvil above the same.

3. A tire tread stitcher comprising a frame having a horizontal supporting arm adapted to support a tire casing and having an anvil member conforming to the interior of the casing, a carriage mounted to reciprocate longitudinally of the arm above the anvil member, a pair of stitching rollers in tandem on said carriage, and a spring associated with each of said rollers and resisting upward movement thereof.

4. A tire tread stitcher comprising a frame having a horizontal supporting arm adapted to support a tire casing and having an anvil member conforming to the interior of the casing, a carriage mounted to reciprocate longitudinally of the arm above the anvil member, a pair of stitching rollers in tandem on said carriage, one of said rollers having a toothed periphery and the other of said rollers having a smooth periphery, and a spring for resisting upward movement of each of said rollers.

5. A tire tread stitcher comprising a frame having a horizontal supporting arm adapted to support a tire casing and having an anvil member conforming to the interior of the casing, a carriage mounted to reciprocate longitudinally of the arm above the anvil member, a pair of stitching rollers in tandem on said carriage, one of said rollers comprising a series of independently rotatable peripherally toothed disks arranged side by side and the other of said rollers having a one piece body with a smooth periphery and a spring for resisting upward movement of each roller.

6. A tire tread stitcher comprising a frame having a horizontal supporting arm adapted to support a tire casing and having an anvil member conforming to the interior of the casing, a carriage mounted to reciprocate longitudinally of the arm above the anvil member, a pair of stitching rollers in tandem on said carriage, one of said rollers being of uniform diameter from end to end and having a toothed periphery, the other of said rollers having a transversely convex peripheral surface, and a spring for resisting upward movement of each of said rollers.

7. A tire tread stitcher comprising a frame having a horizontal supporting arm adapted to support a tire casing and having an anvil member conforming to the interior of the casing, a rail above said arm and parallel thereto, a carriage mounted to travel on said rail, links pivoted to the carriage and extending forwardly and rearwardly, front and rear stitching rollers carried by said links, rods pivoted to said links and guided for vertical movement in the carriage, and a spring on the carriage for resisting upward movement of each of said rods.

WALTER J. BRETH.

REFERENCES CITED

The following references are of record in the file of this patent:

UNITED STATES PATENTS

| Number | Name | Date |
| --- | --- | --- |
| 1,465,177 | Richter | Aug. 14, 1923 |
| 1,760,929 | Wikle | June 3, 1930 |
| 2,201,470 | Bostwick | May 21, 1940 |
| 2,406,093 | Miller | Aug. 20, 1946 |